D. J. HAMMERS.
NUT LOCK.
APPLICATION FILED MAY 8, 1917.
1,247,527.
Patented Nov. 20, 1917.
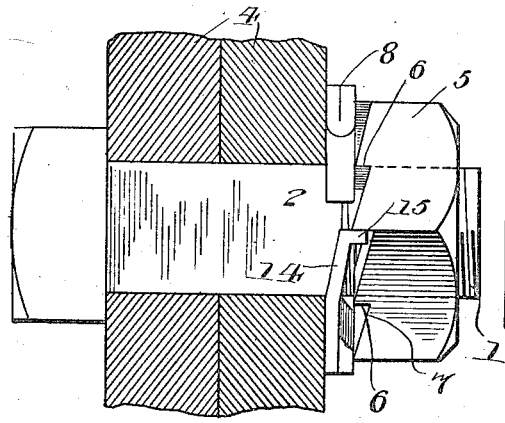
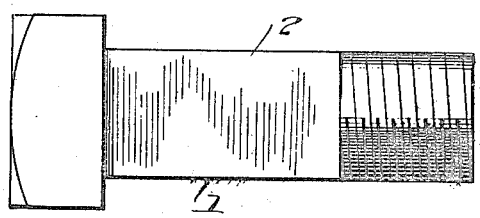
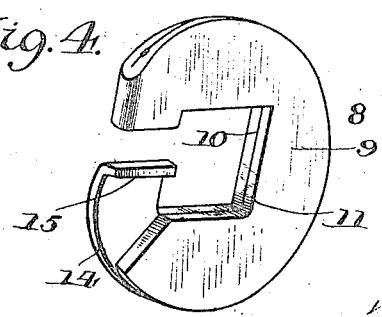
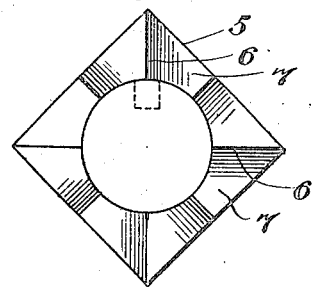
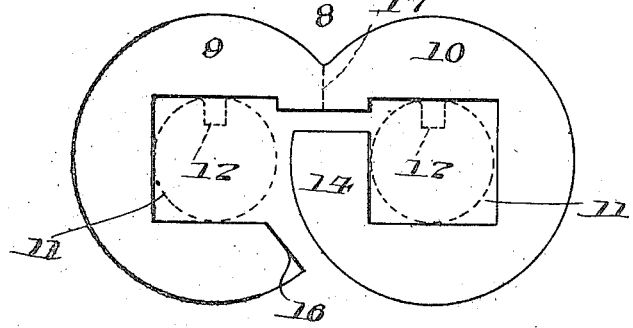
WITNESS
INVENTOR
D. J. Hammers.
BY Victor J. Evans
ATTORNEY

UNITED STATES PATENT OFFICE.

DAVID J. HAMMERS, OF CONEMAUGH, PENNSYLVANIA.

NUT-LOCK.

1,247,527.   Specification of Letters Patent.   Patented Nov. 20, 1917.

Application filed May 8, 1917. Serial No. 167,185.

*To all whom it may concern:*

Be it known that I, DAVID J. HAMMERS, a citizen of the United States, residing at Conemaugh, in the county of Cambria and State of Pennsylvania, have invented new and useful Improvements in Nut-Locks, of which the following is a specification.

This invention relates to a means for locking a nut and bolt together.

An object of the invention is to produce a simple and improved construction whereby a locking element is arranged upon a bolt for longitudinal but not rotary movement with respect to the said bolt, said means including a spring tongue designed to engage with shoulders or teeth provided upon the inner face of a nut, the construction being such as to permit of the disengagement of the tongue from the nut to permit of the unscrewing of the nut from the bolt when desired.

It is a further object of the invention to produce a means for locking a nut upon a bolt comprising a member formed from a substantially 8-shaped plate of spring material which is bent upon itself to form two lapping rounded members, the central opening in each of the said members being shaped to co-engage with the nut, the connecting portion between the said 8-shaped members being cut away and the side of one of the said 8-shaped members being also cut away whereby to provide a spring tongue between the last mentioned cut away portion and the end of the first referred to member forming the said first member with a spring tongue that has its end bent outwardly and which is arranged angularly with respect to the longitudinal plane of the lapping members and the said angular end of the spring tongue being designed to engage in notches or teeth formed in the inner face of a nut which is screwed upon the bolt, the spring tongue being, of course, yieldable to permit of the nut ratcheting over the end thereof when being screwed home upon the bolt, and also to permit the angular end of the spring tongue being forced out of engagement between the teeth of the nut to permit of the unscrewing of the nut from the bolt.

With the above and other objects in view the improvement resides in the construction, combination and arrangement of parts set forth in the following specification and falling within the scope of the appended claim.

In the drawing:

Figure 1 is a side elevation illustrating the application of the improvement,

Fig. 2 is an elevation of the bolt,

Fig. 3 is a view looking toward the inner face of the nut,

Fig. 4 is a perspective view of the locking washer, and

Fig. 5 is a view of the blank from which the washer is constructed.

In the drawing I have illustrated the bolt 1 as having its shank, for a determined portion of its length from its head square or rectangular, as at 2, and beyond the said square or rectangular portion round and threaded. If desired the threads may extend to the corners provided by the square or rectangular portion 2. The bolt is passed through suitable plates 4 of a construction designed to be secured or connected by the bolt and the nut 5 which is threaded upon the bolt. The nut 5 has its inner face formed with radially arranged depressions providing shoulders 6 and angular walls 7 connecting the shoulders.

The locking element or washer is broadly indicated by the numeral 8 and, as illustrated in Fig. 5 of the drawings, is preferably formed from a sheet of flat resilient metal and stamped in the form of a figure 8. The central openings in the members 9 and 10 forming the rounded portions of the 8-shaped figure are square or rectangular, as indicated by the characters 11, but in this connection it should be stated that if desired these openings 11 may be round and formed with inturned tongues, indicated by the dotted lines and indicated by the characters 12, and likewise the shank of the nut 1 instead of being provided with a square or rectangular portion 2 may have its shank round in cross section throughout its length and formed with a longitudinally extending slot 13 indicated by the dotted lines in Fig. 3 of the drawings. The members 9 and 10 are cut longitudinally at their connecting portions, the said cut extending to within the openings 11, and the member 10 from the said cut is bent outwardly, as at 14, providing what I will term a tongue, the said tongue having its outer end bent upon itself to provide a tooth 15. The other member 9 from the connecting portions of the said members 8 and 9 is cut away in a line with two of the walls provided by the opening 11, so that one of the ends of the said members 9 provides an angular shoulder 16. As indicated in Fig. 5 of the drawings the member 9 is bent over the member 10 upon the score line 17, so that the said members lap one another and the tongue 12 is free from contact with the member 9 beyond the end or shoulder 16 of the said member 9, thus adding materially to the resiliency of the tongue 14.

The member 8 is arranged upon the bolt in contacting relation with one of the plates of the superstructure previous to the threading of the nut upon the bolt. The notch or shouldered face of the nut is permitted to ratchet over the tooth 15 of the resilient tongue 14 until the nut is screwed home upon the bolt when the engagement of the said tooth 15 with one of the shoulders provided on the depression or notched face of the nut will hold the said nut against retrograde movement with respect to the bolt. The space between the angular walls provided by the shoulders on the inner face of the nut is sufficient to permit of the insertion of an instrument between the said inner face of the nut and the tongue 14 to bring its tooth 15 out of engagement with the shoulder of the nut and consequently permit of the unscrewing of the nut from the bolt when desired.

Having thus described the invention, what I claim is:

The herein described construction of locking washers designed to co-engage with the shank of a bolt and to engage with the roughened face of a nut, comprising a flat spring member of a substantially 8-shaped formation, the said member being slitted longitudinally from the central connecting portions of the U-shaped elements of the said 8-shaped member and the members of the said 8-shaped member being bent over one another, one of the said rounded elements being cut away at a suitable distance from the said slit to provide the other member with a spring tongue which terminates with the referred to slit, said tongue being arranged angularly with respect to the longitudinal plane of the washer and having its end offset to provide a tongue that is designed to engage with the roughened surface of the nut.

In testimony whereof I affix my signature.

DAVID J. HAMMERS.

Copies of this patent may be obtained for five cents each, by addressing the "Commissioner of Patents, Washington, D. C."